United States Patent
Bose et al.

(10) Patent No.: US 10,534,608 B2
(45) Date of Patent: Jan. 14, 2020

(54) LOCAL COMPUTATION LOGIC EMBEDDED IN A REGISTER FILE TO ACCELERATE PROGRAMS

(75) Inventors: Pradip Bose, Yorktown Heights, NY (US); Alper Buyuktosunoglu, Yorktown Heights, NY (US); Jeffrey Haskell Derby, Research Triangle Park, NC (US); Michele Martino Franceschini, Yorktown Heights, NY (US); Robert Kevin Montoye, Yorktown Heights, NY (US); Augusto J. Vega, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 696 days.

(21) Appl. No.: 13/211,701

(22) Filed: Aug. 17, 2011

(65) Prior Publication Data
US 2013/0046955 A1   Feb. 21, 2013

(51) Int. Cl.
  G06F 15/78   (2006.01)
  G06F 15/16   (2006.01)
  G06F 9/30    (2018.01)
  G06F 9/38    (2018.01)

(52) U.S. Cl.
  CPC ........ *G06F 9/3012* (2013.01); *G06F 9/30098* (2013.01); *G06F 9/30141* (2013.01); *G06F 9/30189* (2013.01); *G06F 9/3891* (2013.01); *G06F 9/3897* (2013.01); *G06F 15/16* (2013.01); *G06F 15/7807* (2013.01); *G06F 15/7821* (2013.01)

(58) Field of Classification Search
  CPC ............... G06F 9/3012; G06F 9/30098; G06F 15/7821; G06F 9/30141
  USPC .......................................................... 712/15
  See application file for complete search history.

(56) References Cited

U.S. PATENT DOCUMENTS

| | | | |
|---|---|---|---|
| 5,555,428 A    | 9/1996 | Radigan et al. | |
| 5,644,746 A    | 7/1997 | Holt et al.    | |
| 5,884,059 A    | 3/1999 | Favor et al.   | |
| 6,047,372 A    | 4/2000 | Thayer et al.  | |
| 6,757,807 B1*  | 6/2004 | Jacobson et al. | 712/23 |
| 6,922,716 B2   | 7/2005 | Desai et al.   | |
| 7,928,763 B2*  | 4/2011 | Vorbach        | 326/38 |
| 7,966,454 B2   | 6/2011 | Arimilli et al. | |
| 8,429,385 B2*  | 4/2013 | Vorbach        | 712/37 |
| 2003/0088757 A1* | 5/2003 | Lindner et al. | 712/37 |
| 2003/0154357 A1 | 8/2003 | Master et al.  | |
| 2006/0004994 A1* | 1/2006 | Uriu et al.    | 712/226 |

(Continued)

OTHER PUBLICATIONS

Hennessy, John L., and David A. Patterson. Computer architecture: a quantitative approach. Second Edition. 1996. pp. 39-44.*

(Continued)

*Primary Examiner* — Keith E Vicary
(74) *Attorney, Agent, or Firm* — Cantor Colburn LLP; Samuel Waldbaum

(57) ABSTRACT

A central processing unit system includes: a pipeline configured to receive an instruction; and a register file partitioned into one or more subarrays where (i) the register file includes one or more computation elements and (ii) the one or more computation elements are directly connected to one or more subarrays.

13 Claims, 7 Drawing Sheets

(56) References Cited

U.S. PATENT DOCUMENTS

| | | | |
|---|---|---|---|
| 2006/0168463 A1 | 7/2006 | Terechko et al. | |
| 2008/0140750 A1 | 6/2008 | Kershaw et al. | |
| 2009/0119479 A1* | 5/2009 | Kleihorst et al. | 712/10 |
| 2010/0039139 A1* | 2/2010 | Vorbach | 326/38 |
| 2010/0241824 A1 | 9/2010 | Carlson et al. | |
| 2012/0124248 A1* | 5/2012 | Chi | 710/22 |
| 2013/0054939 A1* | 2/2013 | Felch | 712/42 |

OTHER PUBLICATIONS

Hennessy, John L., and David A. Patterson. Computer Architecture: A Quantitative Approach. Morgan Kaufmann, 1990, 6 pages.*

John Paul Shen and Mikko H. Lipasti, "Modern Processor Design: Fundamentals of Superscalar Processors," First Edition, McGraw-Hill Companies, 2005; pp. 13, 70, 112, and two front matter pages.*

Barnes et al.; "The ILLIAC IV Computer"; IEEE Transactions on Computer; vol. C-17, No. 8; 12 pages.

Brodman et al.; "Design Issues in Parallel Array Languages for Shared Memory"; Embedded Computer Systems: Architectures, Modeling, and Simulation, Lecture Notes in Computer Science; 2008; vol. 5114/2008, 10 pages.

Fisher et al.; "Compiling for SIMD Within a Register"; In Proceedings of LCPC' 1998; 16 pages.

Love; "The highly-parallel supercomputers: definitions, applications and predictions"; 1980 Proceedings of the National Computer Conference; May 19, 1980; 10 pages.

Woo et al.; "Chameleon: Virtualizing Idle Acceleration Cores of a Heterogeneous Multicore Processor for Caching and Prefetching"; ACM Transactions on Architecture and Code Optimization; vol. 7, No. 1, Article 3; Publication date: Apr. 2010; 35 pages.

Derby et al.; "VICTORIA—VMX Indirect Compute Technology Oriented Towards In-Line Acceleration"; CF D6—Ischia, taly; May 3-5, 2006; 9 pages.

Oppenheim et al.; "Discrete-Time Signal Processing-Second Edition"; Prentice-Hall, Inc.—New Jersey; 1999; 94 pages.

* cited by examiner

LOCAL COMPUTATION LOGIC EMBEDDED IN A REGISTER FILE TO ACCELERATE PROGRAMS

BACKGROUND OF THE INVENTION

The present invention relates to register files; more specifically, a system and method for improving performance of a central processing unit.

One key aspect of throughput-oriented applications is the presence of abundant parallelism. To exploit it, many-core, big chip designs strive to provide a memory sub-system that can constantly feed the cores with data to keep them busy. The memory bandwidth pressure is further exacerbated in the presence of SIMD execution modes, as more bytes per cycle are required for continuous operation.

Recent work has focused on optimizing bandwidth in Chip Multiprocessor (CMP) architectures in order to keep cores well utilized. In some of these works, the emphasis was on the off-chip memory interface and associated bandwidth partitioning or management ideas. More recent throughput-oriented designs have focused on optimizing the on-chip cache hierarchy, with special attention to the last-level cache. There are also architectures that incorporate scratchpad memories close to the cores. Regardless of the adopted strategy, all those approaches are intended to keep large amounts of data as close as possible to the processing units.

SUMMARY OF THE INVENTION

One aspect of the present invention provides a central processing unit system. The central processing unit system includes: a pipeline configured to receive an instruction; and a register file partitioned into one or more subarrays where (i) the register file includes one or more computation elements and (ii) the one or more computation elements are directly connected to one or more subarrays.

Another aspect of the present invention provides a method of improving performance of a central processing unit. The method includes the steps of: receiving an instruction; forwarding the instruction to one or more computation elements embedded within a register file; transforming the instruction into a control signal; and sending the control signal to one or more computation elements; where (i) the register file is partitioned into two or more subarrays, (ii) the register file includes the computation elements, (iii) each of the computation elements is directly connected to one or more subarrays and (iv) at least one of the steps is carried out using a computer device.

Another aspect of the present invention provides a method of improving performance of an central processing unit. The method includes the steps of: receiving an instruction; transforming the instruction into a control signal; and sending the control signal to one or more computation elements embedded within a register file; where (i) the register file is partitioned into two or more subarrays, (ii) the register file includes the computation elements, (iii) each of the computation elements is directly connected to one or more subarrays and (iv) at least one of the steps is carried out using a computer device.

DETAILED DESCRIPTION OF THE PREFERRED EMBODIMENTS

Figure 1:
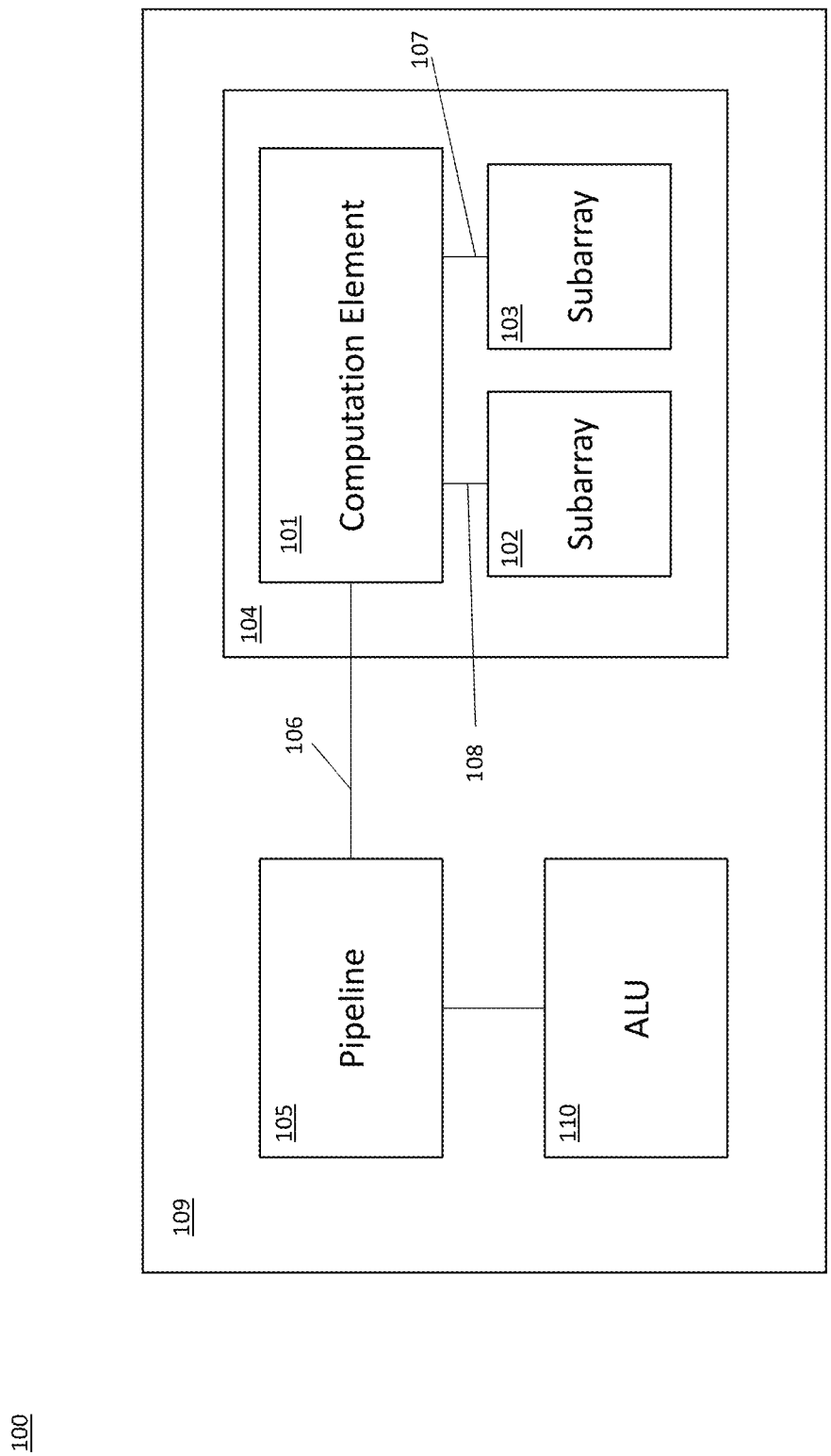
FIG. 1 shows a system with a single computation element according to an embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Today, massively parallel applications demand an increasingly larger number of simple cores and accelerators, high-bandwidth memory systems and explicitly-managed storage systems. However, more cores means there is more demand for bandwidth. More demand for bandwidth means more power consumption. In addition, accelerators take up ever precious real estate in the chip. Lastly, interconnect complexity between these cores increases as the number of cores increase.

Register files inserted into a microprocessor pipeline have traditionally been regarded as multi-ported storage locations which are accessed to extract operands and store results. The functions performed on the data are carried out externally to the register file. The number of operations that can be performed concurrently on that data is constrained by the number of ports in the register file.

As a result, there is a need for a massively parallel computation design which provides power-efficient high bandwidth, special function support with minimal impact on area and computation locality. Power-efficient high bandwidth is needed to feed computation elements with huge amounts of data. A minimal impact on area is needed to be able to place more components on the same chip. Computation locality is needed because movement of data between cores is expensive.

There has been little attention paid to the possibility of significantly re-architecting the organization of the user-addressable register file, even though this would constitute the closest data storage to the processing logic in terms of access time. An embodiment of the present invention exploits the fact that the register file is normally organized as multiple subarrays. A subarray can be a register file subarray which includes a set of registers. Registers can be storage which is accessible by various computing elements for reading or writing through subarray ports. This embodiment does this by attaching functionality via a computation element to each subarray so that operations can be performed concurrently inside the register file. Exemplary embodiments of said computation element can include, but are not limited to, execution support for fixed-point and floating-point computation, scalar and complex multiplications, digital-signal processing, matching and logic comparisons, bit manipulation, among others. This execution support can be for both scalar or vector data (e.g., Single Instruction Multiple Data—SIMD—computation). This relieves the constraints caused by the register file's external port limitations. In other words, this embodiment of the present invention creates a new structure in the processor pipeline: a combination of register storage and execution capabilities that overcomes the bottleneck created by the physical limits imposed by register file ports.

FIG. 1 is a diagram representing a central processing unit system 100 according to an embodiment of the present invention. The system 100 includes a central processing unit (CPU) 109 which receives instructions from an application. The CPU 109 includes a pipeline 105 and a register file 104. This pipeline 105 can be any circuitry required to process said instructions in the central processing unit 109. The pipeline 105 can be configured to either (i) forward instructions directly to a computation element like 101 or (ii) convert an instruction into a control signal, and send the control signal to the computation element 101.

In addition, the pipeline 105 can be configured to execute an instruction in (i) a conventional mode which uses a resource which is part of the regular computation pipeline (such as an arithmetic logic unit 110) or (ii) a new mode which uses a computation element 101. The pipeline 105 can be further configured to use either the conventional mode or the new mode for each instruction the pipeline 105 receives. In other words, the pipeline may process one instruction using the conventional mode and another instruction using the new mode. This mixing of modes enables a close interaction among parallel data operations and scalar data operations.

An instruction is one or more operations of a processor defined by an instruction set architecture. In a broader sense, an "instruction" can be any representation of an element of an executable program, such as a bytecode. On traditional architectures, an instruction includes an opcode specifying the operation to be performed, such as "add contents of memory to register", and zero or more operand specifiers, which can specify registers, memory locations, or literal data. The operand specifiers can have addressing modes determining their meaning or can be in fixed fields.

A control signal can be a pulse or frequency of electricity or light that represents a control command as it travels over a channel. System 100 also includes a register file 104. The register file 104 is partitioned into two subarrays 102 and 103, and also includes a computation element 101. Exemplary embodiments of computation element 101 can include, but are not limited to, execution support for fixed-point and floating point computation, scalar and complex multiplications, digital-signal processing, matching and logic comparisons, bit manipulation, among others. This execution support can be for both scalar or vector data. The computation element 101 can be configured to (i) read values from the registers contained in subarrays 102 or 103 and (ii) store values to the registers contained in subarrays 102 or 103.

The computation element 101 is directly connected to subarray 102 via a direct connection 108. Similarly, the computation element 101 is also directly connected to subarray 103 via a direct connection 107. In the new mode previously mentioned above, the direct connection 107 and 108 enables the computation element 101 to directly access the registers in subarrays 102 and 103. This can be more efficient than using the conventional mode which requires the central processing unit to use the interface provided by the register file 104 in order to access the data in the register file 104. The direct connections 107 and 108 can be independent read/write ports between subarrays 102 and 103 to the computation element 101.

Lastly, system 100 also includes a connection 106 between the pipeline 105 and the computation element 101. The pipeline uses connection 106 to either (i) forward an instruction to the computation element 101 or (ii) send a control signal to the computation element 101.

Figure 2:
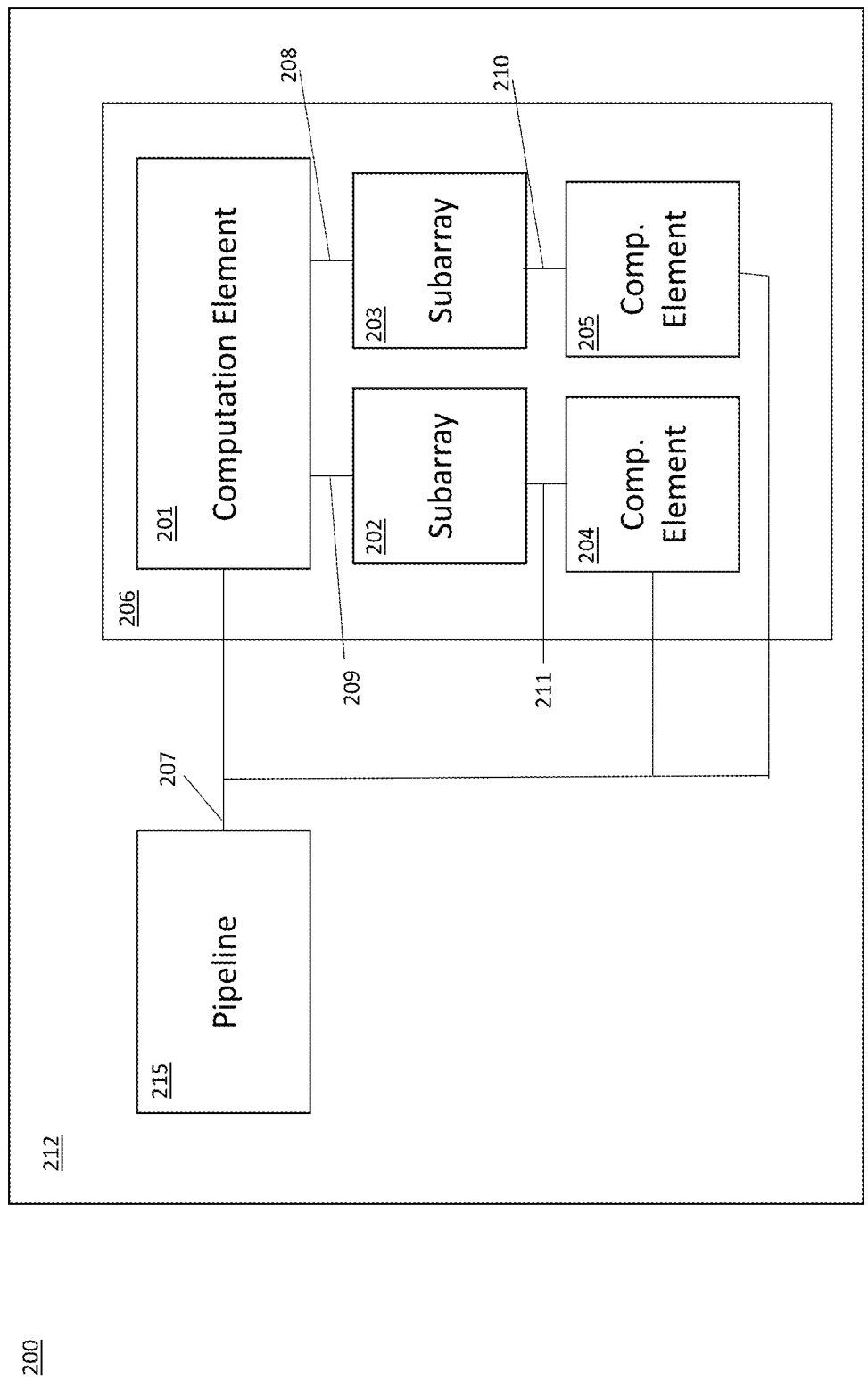
FIG. 2 shows a system with multiple computation elements according to an embodiment of the present invention.

FIG. 2 is a diagram representing a more complex system 200 according to another embodiment of the present invention. The main difference between FIG. 2 and FIG. 1 is the addition of computation elements 204 and 205 as well as direct connections 211 and 210 within CPU 212. In addition, the direct connection 207 connects pipeline 215 with 3 computation elements 201, 204, and 205, instead of just one computation element as in FIG. 1. The purpose of FIG. 2 is to exemplify that multiple configurations of computation elements to subarrays can be accomplished.

Here, computation element 201 can have more complex functionality than computation elements 204 and 205. For example, computation element 201 can be configured to handle multiplication, whereas computation elements 204 and 205 can be configured to handle addition. In this scenario, the register file 206 can also be organized into concurrently operable subspaces of registers. These subspaces can include one or more subarrays, such as subarrays 202 and 203. It should be noted that a subspace can be a set of registers with individual addressability.

For example, one subspace of registers can include subarrays 202 and 203. This subspace is available to computation element 201 because of direct connections 208 and 209 between computation element 201 and subarrays 202 and 203. A second subspace of registers can include subarray 202. This subspace of registers is available to computation element 204 because of the direct connection 211. A third subspace of architected registers can include subarray 203. This subspace of registers is available to computation element 205 because of direct connection 210.

In system 200, computation elements 204 and 205 can operate concurrently by executing the following steps simultaneously with each other: (i) processing a control signal, reading data from a subarray (such as subarray 203 or 202), performing a computation on the data, and writing a result back to a subarray. For example, consider the case where a control signal says to add values from register 0 to register 1 (within a subarray) together and store the result in register 2. Then computation element 204 would read values from register 0 and 1 from subarray 202 and store the result in register 2 in subarray 202 at the same time that computation element 205 would read values from register 0 and 1 from subarray 203 and store the result in register 2 in subarray 203.

In addition, computation elements 204 and 205 can operate on two separate controls signals independently. For example, consider the case where a first control signal says to add values from register 0 and register 1 together and store the result in register 2, and a second control signal says to multiply values from register 0 and register 1 together and store the result in register 2. Then computation element 204 would process the first control signal by reading the values from register 0 and 1 from subarray 202 and storing the result in register 2 in the subarray 202 at the same time that computation element 205 would process the second control signal by reading the values from register 0 and 1 from subarray 203 and storing the result in register 2. It should be noted that this independence also allows for computation element 204 to process a control signal while computation element 205 is idle.

Figure 3:
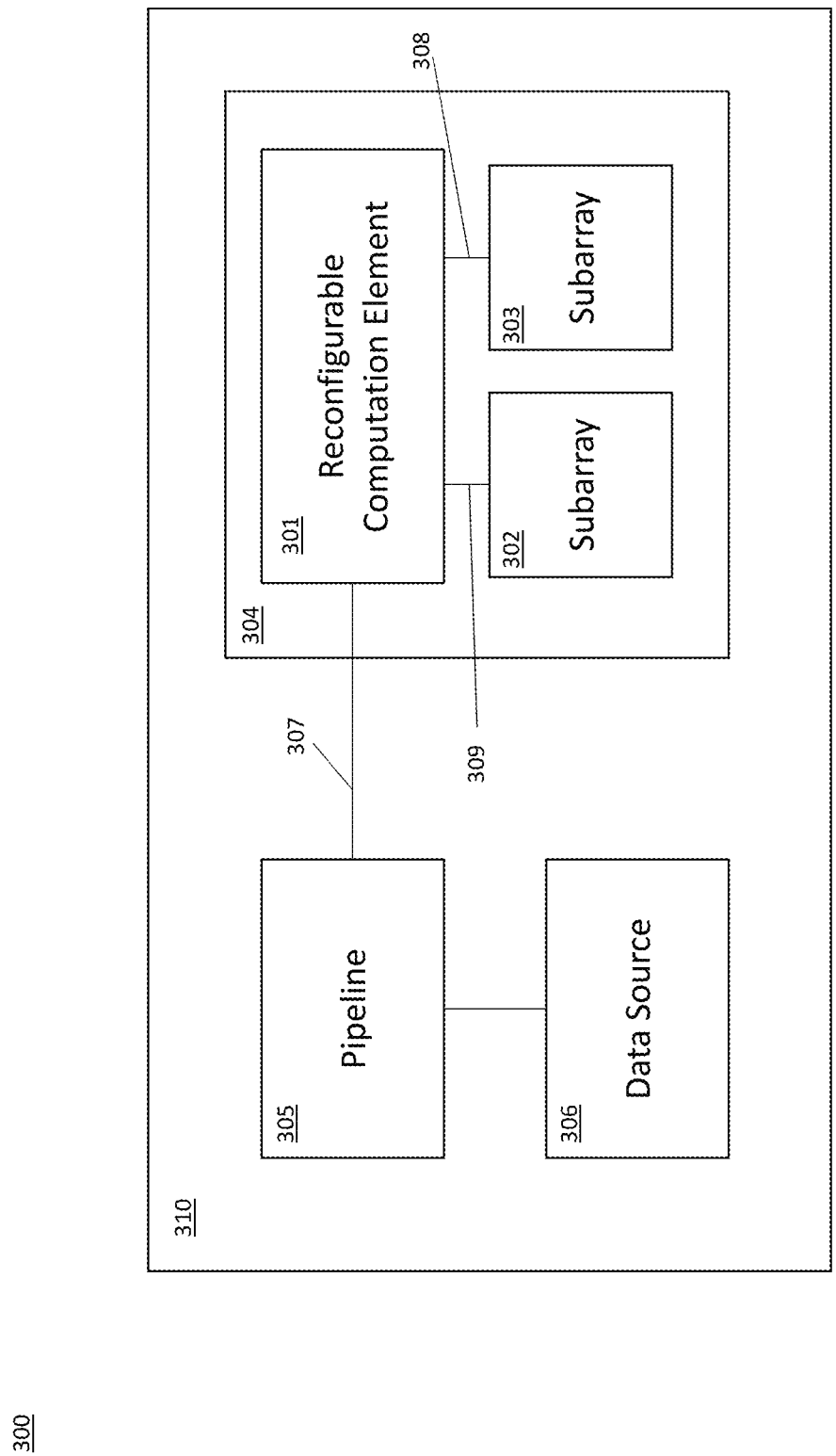
FIG. 3 shows a system with a reconfigurable computation element according to an embodiment of the present invention.

FIG. 3 is a diagram representing a reconfigurable system 300 according to another embodiment of the present invention. The only two differences between the system 300 in FIG. 3 and the system 100 in FIG. 1 is that (i) CPU 310 has a reconfigurable computation element 301, instead of a computation element 101 and (ii) CPU 310 has a data source 306. Subarray 302, subarray 303, direct connection 307, direct connection 308, and direct connection 309 operate in a similar manner to elements 102, 103, 106, 107, and 108, from FIG. 1, respectively. It should be noted that the data source 306 can be external to the CPU 310. There are two main benefits to making the computation element reconfigurable:

(i) significant area savings are achieved in the case where several application-specific acceleration units are built into the chip since the reconfigurable computation element consolidates these several application-specific acceleration units into one reconfigurable unit; and (ii) embedding such acceleration logic into the register file provides significant improvements in bandwidth and memory traffic reduction since it is the closest storage to the processor thereby cutting down on the number of accesses to the cache hierarchy.

The reconfigurable computation element 301 can be reconfigured at runtime of an application. For example, the reconfigurable computation element 301 can be reconfigured after every processor cycle. The reconfigurable element 301 can be reconfigured either (i) based on an instruction received by the pipeline 305 or (ii) by an independent instruction.

For example, the reconfigurable element 301 can be reconfigured based on an instruction received by the pipeline 305 by reserving some space in the instruction to contain special data. This special data can tell the pipeline 305 to pull configuration data from data source 306. The pipeline 305 can then create a control signal based on the configuration data. This control signal can tell the reconfiguration computation element 301 to change to various forms of execution support such as an adder, multiplier, etc. The pipeline 305 can then send the control signal to the reconfigurable computation element 301, which changes the configuration of the reconfigurable computation element 301. Finally, the pipeline 305 can then send control signals to the reconfiguration computation element 301 which relate to the original instruction itself.

In addition, the reconfigurable element 301 can be reconfigured by an independent instruction. In this case, the application can (i) send an independent instruction which tells the pipeline 305 to pull configuration data from data source 306. The pipeline 305 can then create a control signal based on the configuration data. This control signal can tell the reconfiguration computation element 301 to change to various forms of execution support such as an adder, multiplier, etc. The pipeline 305 can then send the control signal to the reconfigurable computation element 301, which changes the configuration of the reconfigurable computation element 301. Afterwards, the application sends a second independent instruction to the pipeline to use the reconfigured computation element 301.

Configurations of the reconfigurable computation element 301 can be stored in a data source 306. This data source can be any storage medium such as a subarray within the register file 304 (not shown), a cache or memory. Different configurations can be stored depending on the available resources and type of instruction. It should be noted that although FIG. 3 shows the data source 306 as being connected to the pipeline 305, the data source 306 can also be (i) connected to the register file 304 or (ii) a portion of the register file 304.

Figure 4:
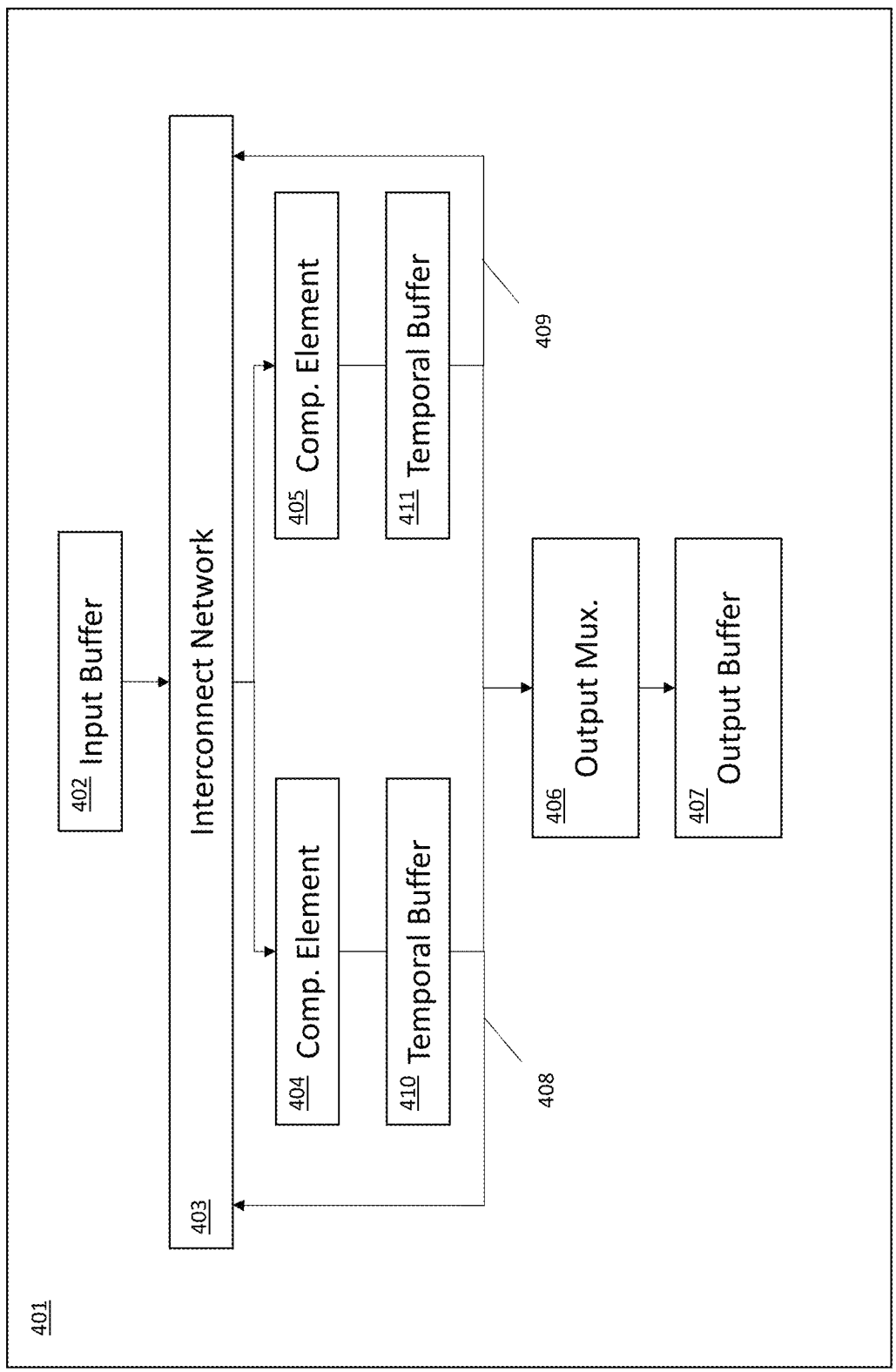
FIG. 4 shows a reconfigurable computation element according to an embodiment of the present invention.

FIG. 4 is a diagram representing a reconfigurable system 400 according to an embodiment of the present invention. Reconfigurable system 400 includes reconfigurable computation element 401. Reconfiguration computation element 401 includes an input buffer 402 which is used to load data from a subarray like the subarrays 102 and 103 shown in FIG. 1. If there is more than one input buffer, these multiple input buffers can be loaded simultaneously from multiple registers in one or more subarrays.

Reconfiguration computation element 401 also includes an interconnect network 403. The interconnect network can behave as a full crossbar, and can take any element from the input buffer 402 or a temporal buffer, and feed it to computation resources 404 and 405. Reconfiguration computation element 401 also includes computation resources 404 and 405. The computation resources 404 and 405 provide computation support via facilities. Facilities can be any computation facility such as a multiplication, an addition/subtraction or maximum selector facilities. A facility can also operate on scalar or vector data. The generated results are stored in a temporal buffer attached to each facility.

It should be noted that a multiple-stage pipeline (as opposed to the single-stage pipeline previously described) can be implemented as well. This can be done by providing feedback loops 408 and 409 from temporal buffers 410 and 411 to the interconnect network 403. Here, the results generated by the computation elements 404 and 405 can be used as inputs for the next computation stage. Reconfiguration computation element 401 also includes an output multiplexer 406 which can act as a gatekeeper to determine whether the output buffer 407 receives data from temporal buffer 408 or 409.

Figure 5:
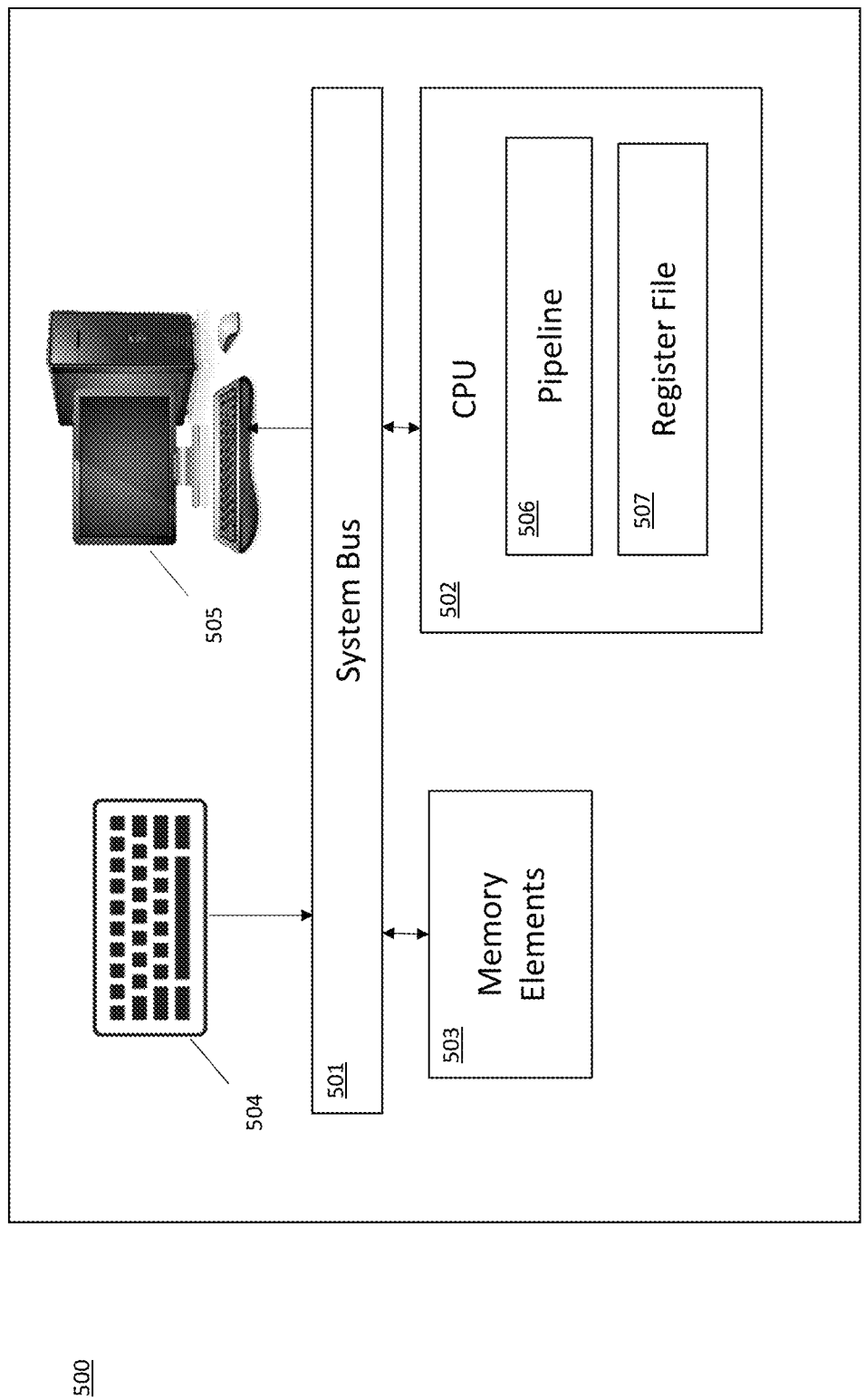
FIG. 5 shows a system for improving performance of a central processing unit according to an embodiment of the present invention.

FIG. 5 is a block diagram of a system 500 according to another embodiment of the present invention. The system 500 can include at least one CPU 502 coupled to memory elements 503 through a system bus 501. As such, the system 500 can store program code of an application within the memory element 503. The CPU 502 can execute the program code accessed from the memory elements 503 via the system bus 501. In one aspect, for example, the system 500 can be implemented as computer that is suitable for storing and/or executing program code. It should be appreciated, however, that the system 500 can be implemented in the form of any system comprising a CPU and memory that is capable of performing the functions described within this specification.

The memory elements 503 can include one or more physical memory devices such as, for example, local memory (not shown) and one or more bulk storage devices (not shown). Local memory refers to random access memory or other non-persistent memory device(s) generally used during actual execution of the program code. Bulk storage device(s) can be implemented as a hard disk drive (HDD), solid state drive (SSD) or other persistent data storage device. The system 500 also can include one or more cache memories (not shown) that provide temporary storage of at least some program code in order to reduce the number of times program code must be retrieved from bulk storage device during execution.

An input/output (I/O) device such as a keyboard 504 optionally can be coupled to the system 500. Additional I/O devices, such as a display and a pointing device (illustrated with a keyboard as an overall system 505) also can be coupled to the system 500. The I/O devices can be coupled to the system 500 either directly or through intervening I/O controllers. Network adapters also can be coupled to the system 500 to enable the system 500 to become coupled to other systems, computer systems, remote printers, and/or remote storage devices through intervening private or public networks. Modems, cable modems, and Ethernet cards are examples of different types of network adapters that can be used with the system 500.

As pictured in FIG. 5, the CPU 502 can include the pipeline 506 and register file 507. The pipeline 506 can be the pipeline 105 in FIG. 1, pipeline 205 in FIG. 2 or the pipeline 305 in FIG. 3 according to an embodiment of the present invention. Similarly, the register file 507 can be the register file 104 in FIG. 1, register file 206 in FIG. 2 or the register file 304 in FIG. 3 according to an embodiment of the present invention.

Figure 6:
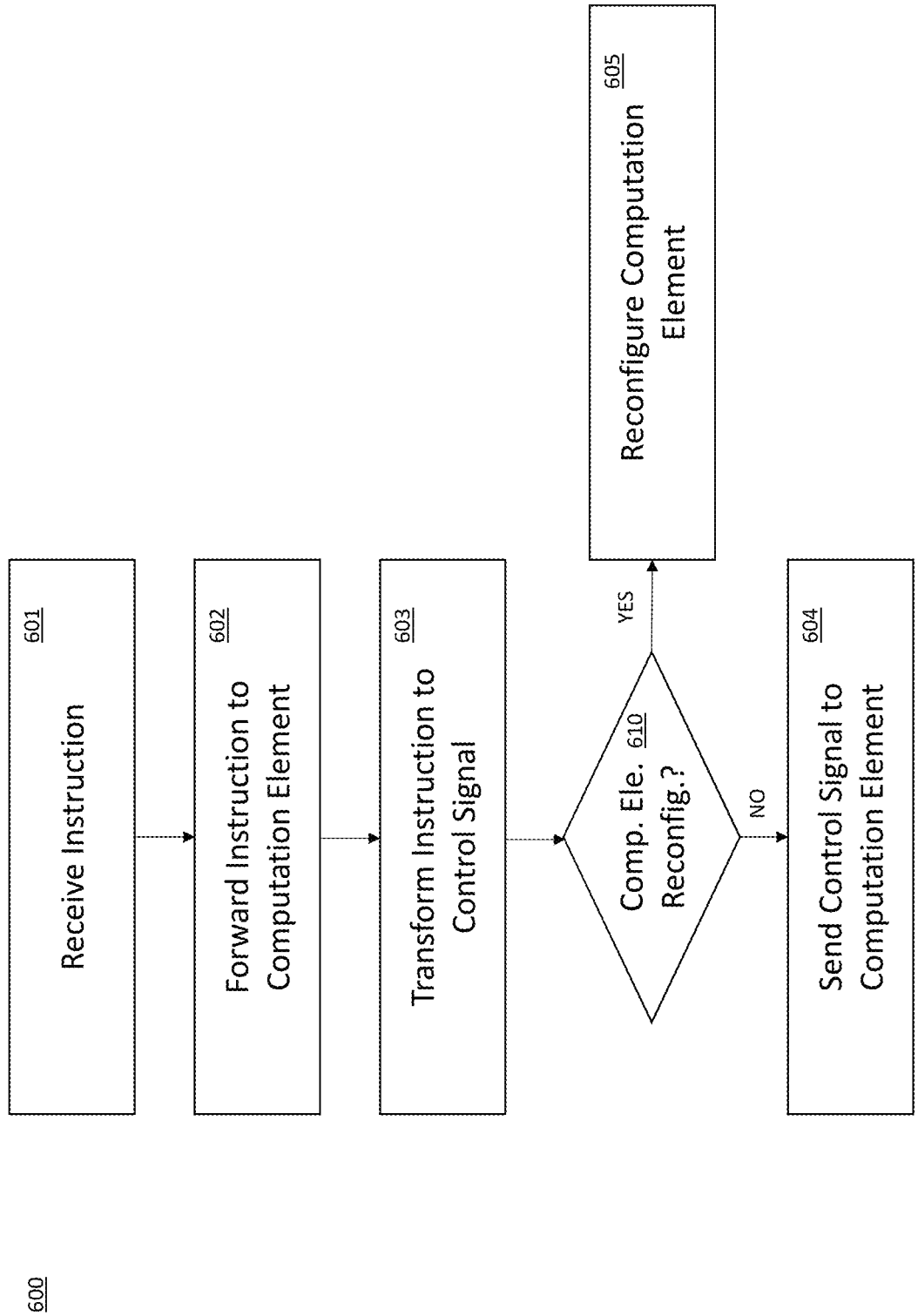
FIG. 6 shows a flowchart of a method for improving performance of a central processing unit according to an embodiment of the present invention.

FIG. 6 is a flowchart illustrating a method 600 of improving performance of a central processing unit according to an embodiment of the present invention. It should be noted that the improvement of performance can be one of execution speed or power efficiency of a central processing unit. In step 601, an instruction can be received by a CPU from an application. In step 602, the pipeline can forward the instruction to a computation element. In step 603, the computation element can transform the instruction into one or more control signals. At this point, it is determined if the computation element is reconfigurable, and the reconfigurable computation element needs to be reconfigured (step 610). If so, a reconfiguring control signal can be sent to the reconfigurable computation element in step 605. If not, then the control signal created in step 603 can be sent from the computation element either to itself or to another computation element in step 604.

Figure 7:
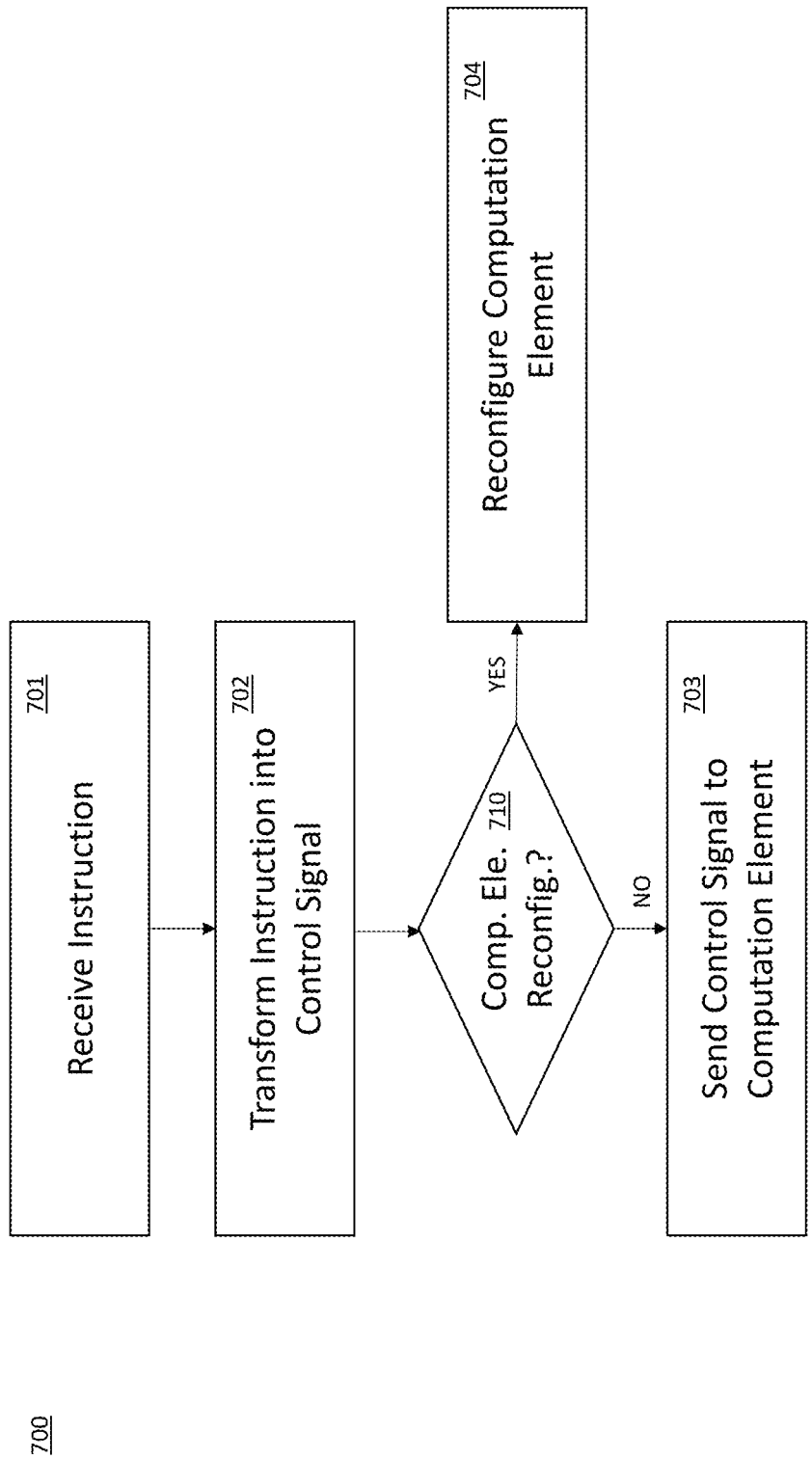
FIG. 7 shows a flowchart of a method for improving performance of a central processing unit according to another embodiment of the present invention.

FIG. 7 is a flowchart illustrating a method 700 of improving performance of a central processing unit according to another embodiment of the present invention. In step 701, an instruction can be received by a CPU from an application. In step 702, the pipeline can transform the instruction into one or more control signals. At this point, it is determined if the computation element is reconfigurable, and the reconfigurable computation element needs to be reconfigured (step 710). If so, a reconfiguring control signal can be sent to the reconfigurable computation element in step 704. If not, then the control signal created in step 702 is sent from the pipeline to a computation element in step 703.

It should be noted that methods 600 and 700 require a register file which is partitioned into at least two subarrays. These subarrays can be directly connected to one or more computation elements.

The flowcharts and block diagrams in the Figures illustrate the architecture, functionality, and operation of possible implementations of systems, methods and computer program products according to various embodiments of the present inventions. In this regard, each block in the flowcharts or block diagrams may represent a module, segment, or portion of code, which comprises one or more executable instructions for implementing the specified logical function(s). It should also be noted that, in some alternative implementations, the functions noted in the block may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A central processing unit embodied as hardware, comprising:
    a hardware pipeline, comprising a resource, configured to receive instructions comprising a first set of instructions and a second set of instructions, wherein said first set of instructions are disjoint with said second set of instructions, such that there are no instructions that are members of both said first set of instructions and said second set of instructions;
    a register file located outside the hardware pipeline and internal to the central processing unit, said register file comprising a plurality of subarrays; and
    at least one computation element embedded within the register file, said at least one computation element directly connected to at least one subarray of said plurality of subarrays;
    wherein said hardware pipeline is configured to execute said first set of instructions according to a first mode that comprises using said resource to execute said first set of instructions;
    wherein said hardware pipeline is further configured to execute said second set of instructions according to a second mode that comprises said hardware pipeline using said at least one computation element to execute said second set of instructions.

2. The central processing unit according to claim 1 wherein (i) said register file is organized into a plurality of concurrently operable subspaces of registers and (ii) each of said plurality of concurrently operable subspaces comprises at least one of said plurality of subarrays.

3. The central processing unit according to claim 1 wherein said at least one computation element is configured to:
    transform an instruction of said second set of instructions to a control signal.

4. The central processing unit according to claim 1 wherein said hardware pipeline is further configured to:
    when operating in the second mode, transform an instruction of said second set of instructions to a control signal; and
    send said control signal to one of said at least one computation element.

5. The central processing unit according to claim 1 wherein said at least one computation element is configured to:
    read a value from a first register within said plurality of subarrays; and
    store a calculated value into a second register within said plurality of subarrays.

6. The central processing unit according to claim 1 wherein (i) said at least one computation element comprises at least two computation elements and (ii) there are at least two computation elements which operate concurrently with each other.

7. The central processing unit according to claim 1 wherein (i) said at least one computation element comprises at least two computation elements and (ii) there are at least two computation elements which operate independently of each other.

8. The central processing unit according to claim 1 wherein (i) said at least one computation element is a reconfigurable computation element and (ii) said reconfigurable computation element is reconfigurable at runtime of an application.

9. The central processing unit according to claim 8 wherein said reconfigurable computation element is reconfigurable at every processor cycle.

10. The central processing unit according to claim 8 wherein a configuration of said reconfigurable computation element is stored in a data source.

11. The central processing unit according to claim 10 wherein said configuration is set using an independent instruction.

12. The central processing unit according to claim 11 wherein said configuration depends on said independent instruction.

13. The central processing unit according to claim 8 wherein said reconfigurable computation element comprises:
- at least one input buffer;
- a plurality of computation resources;
- an interconnect network connected to said plurality of computation resources and said at least one input buffer;
- an output multiplexer connected to said plurality of computation resources; and
- an output buffer.

* * * * *